United States Patent

Gustafsson et al.

[11] Patent Number: 5,923,749
[45] Date of Patent: Jul. 13, 1999

[54] METHOD AND SYSTEM FOR ELIMINATING ACOUSTIC ECHOS IN A DIGITAL TELECOMMUNICATION SYSTEM

[75] Inventors: Sune Micael Gustafsson, Tyreso; John-Erik Samuel Eriksson, Umea, both of Sweden

[73] Assignee: Telefonaktiebolaget LM Ericsson, Stockholm, Sweden

[21] Appl. No.: 08/753,430

[22] Filed: Nov. 25, 1996

Related U.S. Application Data

[60] Provisional application No. 60/008,914, Dec. 20, 1995.

[30] Foreign Application Priority Data

Dec. 6, 1995 [SE] Sweden .................................. 9504369

[51] Int. Cl.⁶ .............................. H04B 3/20; H04M 9/08
[52] U.S. Cl. ......................... 379/410; 379/242; 379/406; 370/286; 370/289
[58] Field of Search ............................. 379/390, 93, 388, 379/410, 406, 3, 201, 402, 409, 411, 407, 408, 242, 202, 196, 197, 198; 370/15, 58, 286, 289, 290; 179/18 ES, 1 VC; 381/66

[56] References Cited

U.S. PATENT DOCUMENTS

| | | | |
|---|---|---|---|
| 3,769,466 | 10/1973 | Von Pfeil et al. | 379/408 |
| 4,359,606 | 11/1982 | Shoichi | 179/1 |
| 4,577,310 | 3/1986 | Korsky et al. | 379/58 |
| 4,726,062 | 2/1988 | Martz et al. | 379/390 |
| 4,845,746 | 7/1989 | Li | 370/286 |
| 5,014,306 | 5/1991 | Rodgers et al. | 379/286 |
| 5,307,405 | 4/1994 | Sih | 379/410 |
| 5,327,489 | 7/1994 | Anderson et al. | 379/410 |
| 5,333,195 | 7/1994 | Bowker et al. | 379/410 |
| 5,343,521 | 8/1994 | Jullien et al. | |
| 5,351,291 | 9/1994 | Menez et al. | 379/410 |
| 5,381,474 | 1/1995 | Lahdemaki et al. | 370/286 |
| 5,414,763 | 5/1995 | Hirata | 379/201 |
| 5,450,487 | 9/1995 | Lahdemaki et al. | 370/286 |
| 5,473,686 | 12/1995 | Virdee | 379/410 |
| 5,475,731 | 12/1995 | Rasmusson | 379/3 |
| 5,511,064 | 4/1996 | Oh et al. | 370/15 |
| 5,513,265 | 4/1996 | Hirano | 379/410 |
| 5,550,901 | 8/1996 | Williams | 379/93 |
| 5,559,881 | 9/1996 | Sih | 379/410 |
| 5,657,384 | 8/1997 | Staudacher et al. | 379/388 |
| 5,661,813 | 8/1997 | Shimauchi et al. | 381/66 |
| 5,666,407 | 9/1997 | Pfeifer | 379/202 |
| 5,668,871 | 9/1997 | Urbanski | 379/406 |

OTHER PUBLICATIONS

Patent Abstracts of Japan, Takashi Obara, "Base Station Equipment for Radio Communication System", abstract of JP, A, 4–207825 (Toshiba Corp.), vol. 16, No. 5, E–1292, Jul. 29, 1992.

Patent Abstract of Japan, Takashi Obara, "Base Station Equipment for Radio Communication System", abstract of JP, A, 4–207823 (Toshiba Corp.), vol. 16, No. 550, E1292, Jul. 29, 1992.

Patent Abstract of Japan, Yuji Okuda, "Echo Canceller", abstract of JP, A, 5–292174 (Toshiba Corp.), vol. 18, No. 84, E1506, Nov. 5, 1993.

Patent Abstract of Japan, Yuji Umemoto, "Voice Communication Equipment", abstract of Japan, A, 6–30104 (Toshiba Corp.), vol. 18, No. 240, E–1545, Feb. 4, 1994.

*Primary Examiner*—Scott Wolinsky
*Attorney, Agent, or Firm*—Burns, Doane, Swecker & Mathis, L.L.P.

[57] ABSTRACT

Acoustic echo reduction is accomplished in connection with a telephone call utilizing a handsfree telephone unit. An Acoustic Echo Controlling (AEC) device (14) is implemented in a digital exchange (12) of the telecommunication system so that the reduction of acoustic echoes can be achieved from all telephones connected to the digital exchange.

12 Claims, 4 Drawing Sheets

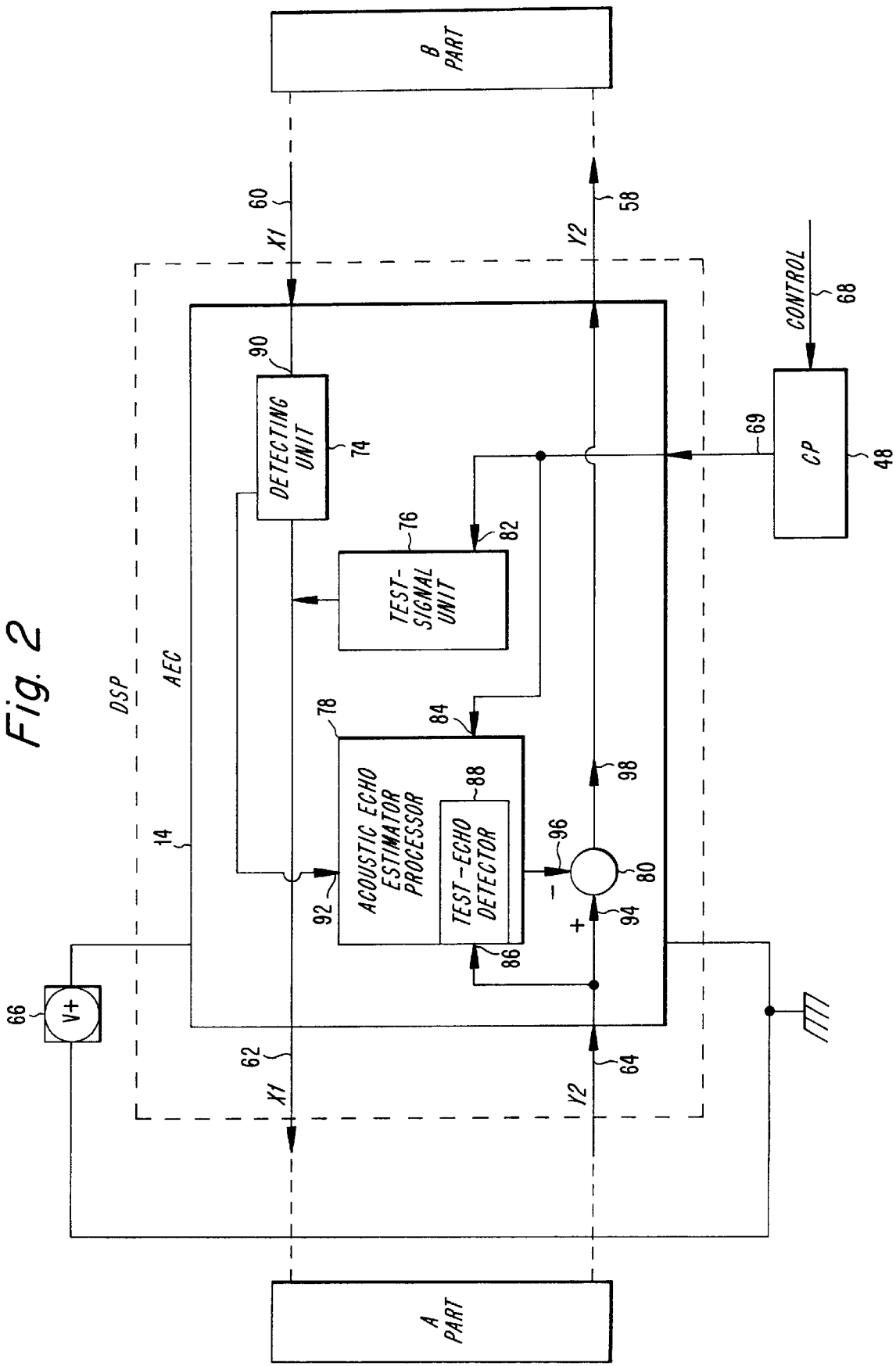

| CHANNEL, LINE | SIGNAL | KIND |
|---|---|---|
| X1, 62 | | TEST |
| Y2, 64 | | TEST ECHO |

| X1, 60 | | BSPEECH |
|---|---|---|
| X1, 62 | | BSPEECH |
| Y2, 64 | | BSPEECH ECHO (BE) |
| Y2, 58 | | BE eliminated |

| X1, 60 | | BSPEECH |
|---|---|---|
| X1, 62 | | BSPEECH |
| Y2, 64 | | BE+ASPEECH |
| Y2, 58 | | ASPEECH |

# METHOD AND SYSTEM FOR ELIMINATING ACOUSTIC ECHOS IN A DIGITAL TELECOMMUNICATION SYSTEM

REFERENCE TO COPENDING APPLICATION

This application claims the benefit of U.S. Provisional application Ser. No. 60/008,914, filed Dec. 20, 1995.

FIELD OF THE INVENTION

The present invention relates to a method and system for eliminating acoustic echoes during a telephone call. More particularly the invention relates to the implementation of Acoustic Echo Controllers (AEC) in a telecommunication system with digital exchanges and digital handsfree telephones or audio terminals.

DESCRIPTION OF RELATED ART

In a room all kind of sound, for instance speech, generates acoustical echoes. The acoustical echo in a room depends on the size of the room, what kind of furniture is in the room and the design of the room.

A basic problem in telecommunication system in conjunction with telephone calls is acoustical echoes when audio terminals, such as handsfree telephones are being used. This is because speech signals received in a handsfree telephone placed in a room will generate an echo in the room. The generated echo will be transmitted in the telephone lines back to the person who originally sent them. The described acoustical echoes are very troublesome since they will disturb the ongoing telephone call.

There are some known methods for cancelling or reducing the above described acoustical echoes. One known method for reducing acoustical echoes are the voice switching function in handsfree telephones. However the voice switching function in handsfree telephones is sensitive to background noise and will sometimes block out a weaker talker in favor of a stronger and more efficient talker.

Another known method for cancelling acoustical echoes are handsfree telephones especially built for conferencing, which telephones have a separate echo cancelling built-in function. An example is the conference telephone from KonfTel AB with product name CU 100.

The telecommunication standardization sector of International Telecommunication Union ITU, (ITU-T) has prepared a recommendation G. 167 03/93 for Acoustic Echo Controllers, which recommendation is hereby incorporated by reference.

It is known to reduce electrical echoes by using Electrical Echo Cancelers in telecommunication systems. The following documents relate to electrical echo cancelers. However, none of the documents discloses solutions to the problems when acoustic echoes appear.

Document U.S. Pat. No. 5,333,195 with title "Telephone Network Speech Signal Enhancement" describes a telephone station in which an electrical echo canceler is implemented (FIG. 3). Document WO 93/09610 discloses an arrangement for the control of an echo canceler in an exchange. Document GB 2 164 828 discloses a digital hybrid apparatus for reducing electrical echoes and to be used in a line circuit employed in a digital switching network. Document GB 2 232 860 describes an audio signal echo cancellation circuit. In the document it is mentioned that the circuit may be built into a telephone line interface circuit. Document U.S. Pat. No. 3,769,466 describes a telephone transmission system with echo suppressors. Document WO 94/18759 describes a process and a device for the detection of disabling tone of the echo canceler in a telephone switching exchange. Document DE 38 12 640 describes a transverse filter for reducing electrical echoes. The filter may be integrated in an exchange. The Swedish patent document SE 446 291 describes a conference connection with electrical echo reduction implemented.

SUMMARY OF THE INVENTION

The present invention solves the earlier described problem in connection with handsfree telephones and acoustic echoes. The present invention has several advantages compared to the related art that solves the similar problem. The base of this invention is that an Acoustic Echo Controlling function is implemented in a digital exchange in a communication system. The Acoustic Echo Controlling function can be reached from a handsfree telephone and doesn't have to be implemented in the handsfree telephone.

The invention is related to a method and an arrangement in which the acoustic echoes are eliminated by use of an acoustic echo controlling device in the exchange. The echo controlling device is directly controlling the separate send and receive digital channels and makes all the adaptions and cancellations necessary for a true duplex conversation.

A first advantage obtained when implementing the acoustic echo controlling device in the exchange is that a regular handsfree telephone can be used and the AEC function is being reached from the telephone, for example by dialing a code on the telephone. Thus, the telephone has to be equipped with a loudspeaker.

A second advantage obtained is that several telephones can share this function. The profit by doing this is considerable since this function is very expensive because the need of power supply and the complexity of the AEC device.

BRIEF DESCRIPTION OF THE DRAWINGS

A more complete understanding of the method and system of the present invention may be had by reference to the detailed description following, taken in conjunction with the accompanying drawings, wherein:

FIG. 2 is a block diagram of the Acoustic Echo Controlling (AEC) device;

DESCRIPTION OF PREFERRED EMBODIMENTS

Figure 1:
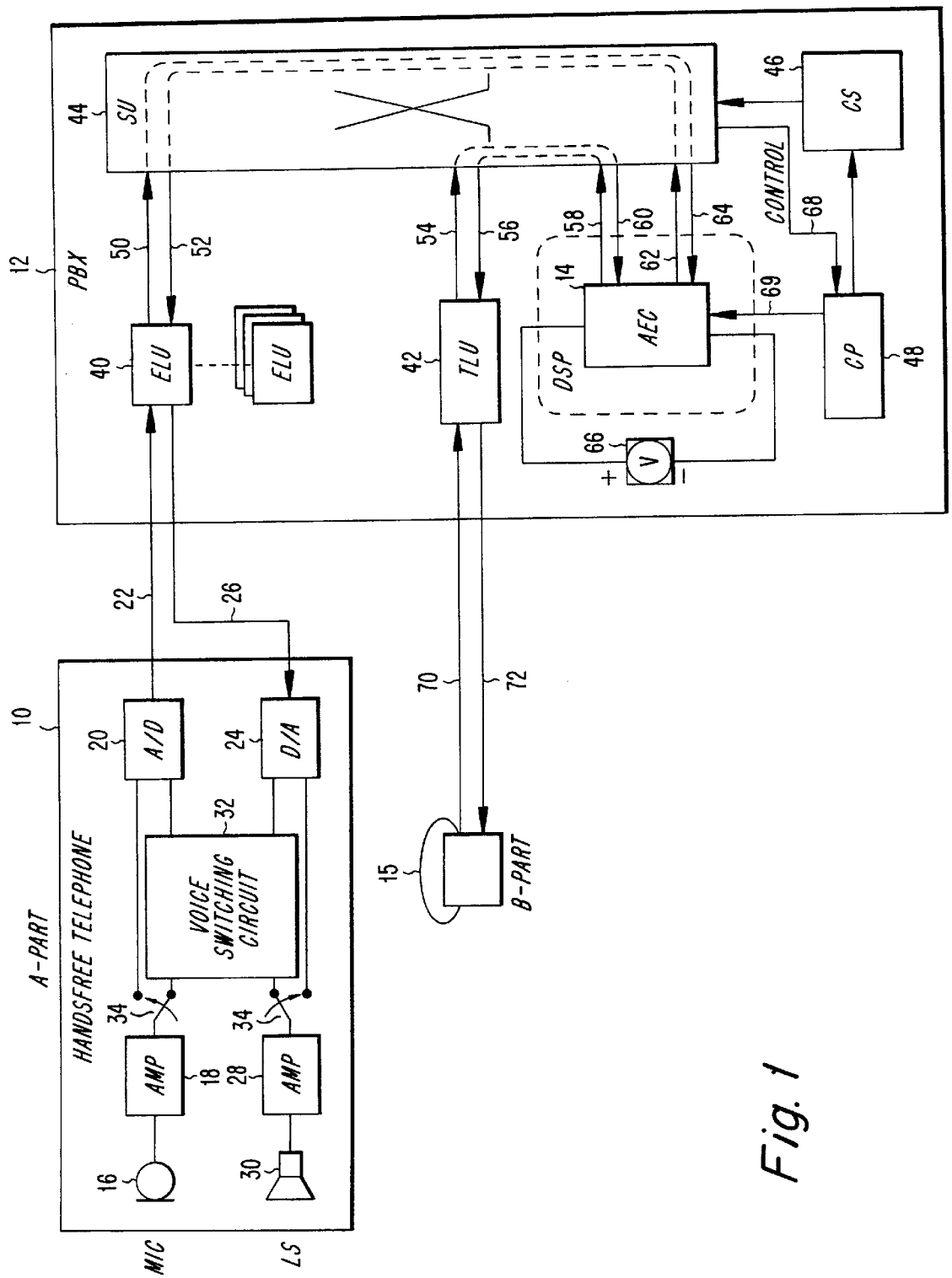
FIG. 1 is a block diagram of an A-part telephone connected to a PBX (Private Branch Exchange) including an Acoustic Echo Controlling (AEC) device, and a B-part telephone.

FIG. 1 discloses a block diagram of a first telephone 10 used by an A-part and connected to a Private Branch Exchange (PBX) 12 including an Acoustic Echo Controlling (AEC) device 14 according to the invention. A B-part telephone 15 is also connected to the PBX since a telephone call is established between the A-part and the B-part. The B-part telephone 15 may be permanently connected to the PBX, but can also be a telephone outside the PBX, as in this example. The first telephone 10 is a telephone which can be used as a digital audio terminal which in this example is a hands free telephone. The handsfree telephone 10 includes a microphone 16 for receiving the speech from the A-part, a first amplifier 18 for amplification of the speech and an A/D converter 20 for converting the analog speech signal to a digital signal which is being sent on a digital line 22 connected to the exchange 12.

The handsfree telephone 10 also includes a D/A converter 24 for converting digital speech signals from the B-part to analog speech signals. The digital speech signals are received on a digital line 26 from the PBX. Included in the telephone is also a second amplifier 28 for amplification of the received analog speech signals and a loudspeaker 30 for transmitting the analog speech signals to the A-part.

A voice switching circuit 32 is in this example connected between the first amplifier 18 and the A/D converter 20. The voice switching circuit 32 is also connected between the second amplifier 28 and the D/A converter 24. The voice switching circuit 32 is implemented in some telephones and is being used for permitting speech from one part at the same time and the purpose is to avoid problems with acoustic echoes. The voice switching circuit 32 is being disconnected by switches 34 when the AEC 14 in the exchange instead is being connected to the handsfree telephone 10.

The PBX 12 includes an Extension Line Unit (ELU) 40, which the handsfree telephone 10 is connected to, a Trunk Line Unit 42 (TLU) which the B-part telephone 15 is connected to, a Switching Unit 44 (SU) for switching speech or data signals in the PBX, a Control Store 46 (CS) for controlling the switching, a Central Processor 48 (CP) for controlling the activities in the PBX and the AEC device 14 for eliminating acoustical echoes.

The ELU 40 is a regular unit in a PBX and is connected to the SU 44 by digital lines 50,52. The TLU 42 is a regular unit in a PBX and is connected to the SU 44 on digital lines 54,56. The components mentioned ELU,SU,TLU are not described in greater detail because they are regular components in an exchange.

The Acoustic Echo Controlling device 14 is connected to the Switching Unit 44 on lines 58,60,62,64. The handsfree telephone can be permanently connected to the AEC, for instance if the handsfree telephone is in a meeting room, or the handsfree telephone 10 can be connected to the AEC on request. For instance, the telephone 10 can be connected to the AEC by dialing a code. Then, if the telephone is equipped with a voice switching circuit 32, it is being disconnected when the AEC 14 is being connected.

The AEC device 14 is connected to a power supply unit 66 and the AEC is in this example a part of a Digital Signal Processor (DSP) in the PBX. The Digital Signal Processor DSP is not described more in this document because it is a regular device in an exchange.

The Central Processor 48 is connected to the AEC device 14 by a line 69 for controlling its activation and which telephone call it shall operate on. As in a regular PBX the Central Processor 48 is connected to the Control Store 46 which in turn is connected to the Switching Unit 44. The switching unit 44 is connected to the Central Processor 48 by a line 68 on which control signals from the handsfree telephone are being sent.

The second telephone 15 can be of any type, for instance a regular telephone. It is sending speech on a sending line 70 and is receiving speech on a receiving line 72, both lines are connected to the Trunk Line Unit 42.

The system described in FIG. 1 could also be an Intercom system and in that case the Trunk Line Unit is exchanged to an Extension Line Unit (ELU) for a number of extensions.

FIG. 2 discloses a block diagram of the Acoustic Echo Controlling device 14. It includes a detecting unit 74 for detecting speech signals from the B-part, a test signal unit 76 for sending a test signal in order to determine the echo characteristics of the room in which the handsfree telephone is located, an acoustic echo estimator processor 78 for controlling the elimination of echo signals and a summing network 80 in which a calculated echo signal are being reduced from an incoming speech signal.

The AEC 14 has two main tasks. The first is to determine the echo characteristics of the room in which the handsfree telephone is placed. When the Apart wants to make a call and dials a code on his phone, a request signal is being sent from the handsfree telephone, through the PBX, to the Central Processor 48 on line 68. Upon receiving the request signal, the CP 48 sends a start signal on line 69 to the input 82 of the test signal unit 76 and to an input 84 of the acoustic echo estimator processor 78. The start signal resets the acoustic processor 78 and initiates a test signal TEST being sent to the handsfree telephone on line 62 from the test signal unit 76. The handsfree telephone is placed in a room. The test signal TEST generates an acoustic echo in the room and the acoustic echo signal is transmitted on line 64 to input 86 on a test echo detector 88 in the acoustic echo estimator processor 78, which determines the echo characteristics EC of the room. This determination is well known and is not described in greater detail in this document. The test signal and the echo test signal can be sent on any free speech channel through the PBX. In a different embodiment the test signal can be sent on the channels allotted for speech received by the A-part and transmitted from the A-part.

The other main task is to eliminate acoustic echoes received from the A-part due to speech by the B-part. A first speech signal is sent from the B-part on line 60 to an input 90 of the detecting unit 74. The speech channel used is controlled in a regular way by the CS 46. The first speech signal is being transmitted to the A-part on line 62 and the detecting unit 74 sends the first speech signal to an input 92 on the estimator processor 78. The estimator processor 78 uses the determined EC of the room and the detected first speech signal to calculate the echo signal that will appear on line 64 from the handsfree telephone and is received on an input 94 of the summing network. The calculated echo signal is being sent by the echo estimator processor 78 to an input 96 of the summing network 80. The summing network will reduce the calculated echo signal from the echo signal received on input 94 and transmit the difference on output 98 to line 58 and further to the B-part. This elimination of acoustic echo signals can be done in a well known way and is not described in detail in this document. Recommendations for an Acoustic Echo Controlling unit can be found in the earlier mentioned document ITU-T G.167 03/93.

Figures 3A, 3B, 3C, 3D:
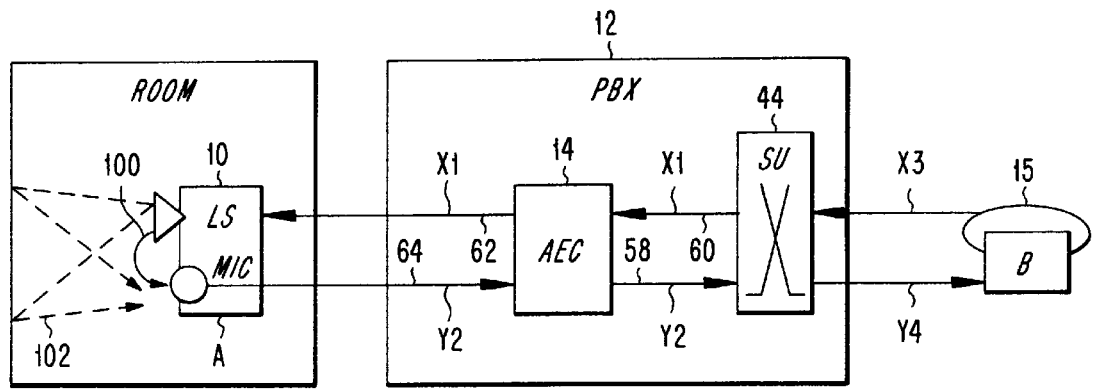
FIG. 3a is a simplified block diagram of the telephones and the AEC device implemented in the PBX, which diagram also illustrates the digital channels used for a call and how the acoustic echo is being generated.
FIG. 3b is a signalling diagram illustrating a test signal and its echo.
FIG. 3c is a signalling diagram illustrating signals when the B-part is speaking.
FIG. 3d is a signalling diagram illustrating signal when the A-part and the B-part are simultaneously speaking.

FIG. 3a is a simplified block diagram disclosing this inventive system including the acoustic echo controlling device AEC implemented in the PBX and the AEC device 14 connected to the handsfree telephone 10. The telephones and the PBX are connected to each other by lines disclosed in the figure and described in FIG. 1 and 2. When a connection is being established between the A-part and the B-part, the PBX selects a first digital channel X1 for speech received by the A-part from the PBX. For speech transmitted from the A-part to the PBX a second digital channel Y2 is selected or allotted. In the SU 44 the speech from the B-part is switched from a third digital channel X3 to the first digital channel X1. For speech from the PBX to the B-part a fourth digital channel Y4 is used. This switching is done in a well known way and is not a part of the invention and is therefore not described in detail in this document. A digital channel is equivalent to a time slot in a frame, which is well known in digital telecommunication networks and is therefore not described further in this document.

From FIG. 3a it can be seen that the acoustic echo controlling device AEC is connected on the A- part side of the switching unit SU in the PBX. Thus, a speech signal from the B-part, on the digital channel X3, is being switched to the first digital channel X1 before it is connected to the AEC device.

FIG. 3a also illustrates how the echo signals appear. Speech signals from the B-part are received in the handsfree telephone 10 and transmitted by the loudspeaker LS into the room. Parts of the received speech will go directly into the microphone and parts will be returned, as echo, from the walls and go into the microphone (100,102). Thus, all speech signals originating from the B-part and returned to the PBX from the handsfree telephone are called the acoustic echo signals.

FIG. 3b is a signalling diagram on the test signal TEST and its echo signal. The test signal TEST is on request sent from the AEC on the first digital channel X1, on line 62, to the handsfree telephone 10. The appearing echo signal TEST ECHO is being received in the AEC on the second digital channel Y2, on incoming line 64. The echo signal is analyzed in accordance with the description in connection with FIG. 2 and the echo characteristics of the room is determined.

FIG. 3c illustrates the speech signals that will appear around the AEC when the B-part is speaking. A speech signal BSPEECH from the B-part is received by the AEC on digital channel X1, on line 60, and is being detected. The received speech signal BSPEECH is being transmitted to the A-part on the same digital channel X1, on line 62. An echo signal BSPEECH ECHO will be received in the AEC on digital channel Y2, on line 64. The AEC will eliminate the echo signal BSPEECH ECHO in accordance with description in connection with FIG. 2 and therefore no echo signal will be sent from the AEC on digital channel Y2 on line 58.

FIG. 3d illustrates speech signals that will appear around the AEC when the B-part and the A-part are speaking simultaneously. A speech signal BSPEECH from the B-part is received by the AEC on digital channel X1, on line 60, and is being detected. The received speech signal BSPEECH is being transmitted to the A-part on the same digital channel X1, on line 62. An echo signal BSPEECH ECHO will be received in the AEC on digital channel Y2, on line 64. Simultaneously a speech signal ASPEECH from the A-part will be received in the AEC on digital channel Y2, on line 64. The AEC will eliminate the echo signal BSPEECH ECHO in accordance with description in connection with FIG. 2 and therefore as a result no echo signal is being sent from the AEC on digital channel Y2 on line 58, only the speech signal from the A-part ASPEECH.

The apparent advantages with implementing the acoustic echo controlling device AEC in the PBX is that it can be shared by several handsfree telephones connected to the PBX. Different handsfree telephones may at different times use the AEC. It is also possible that the AEC 14 can operate on a plurality of digital channels simultaneously. The number depends on the capacity of the AEC. It is also possible to connect several AEC devices in the PBX.

Figure 4:
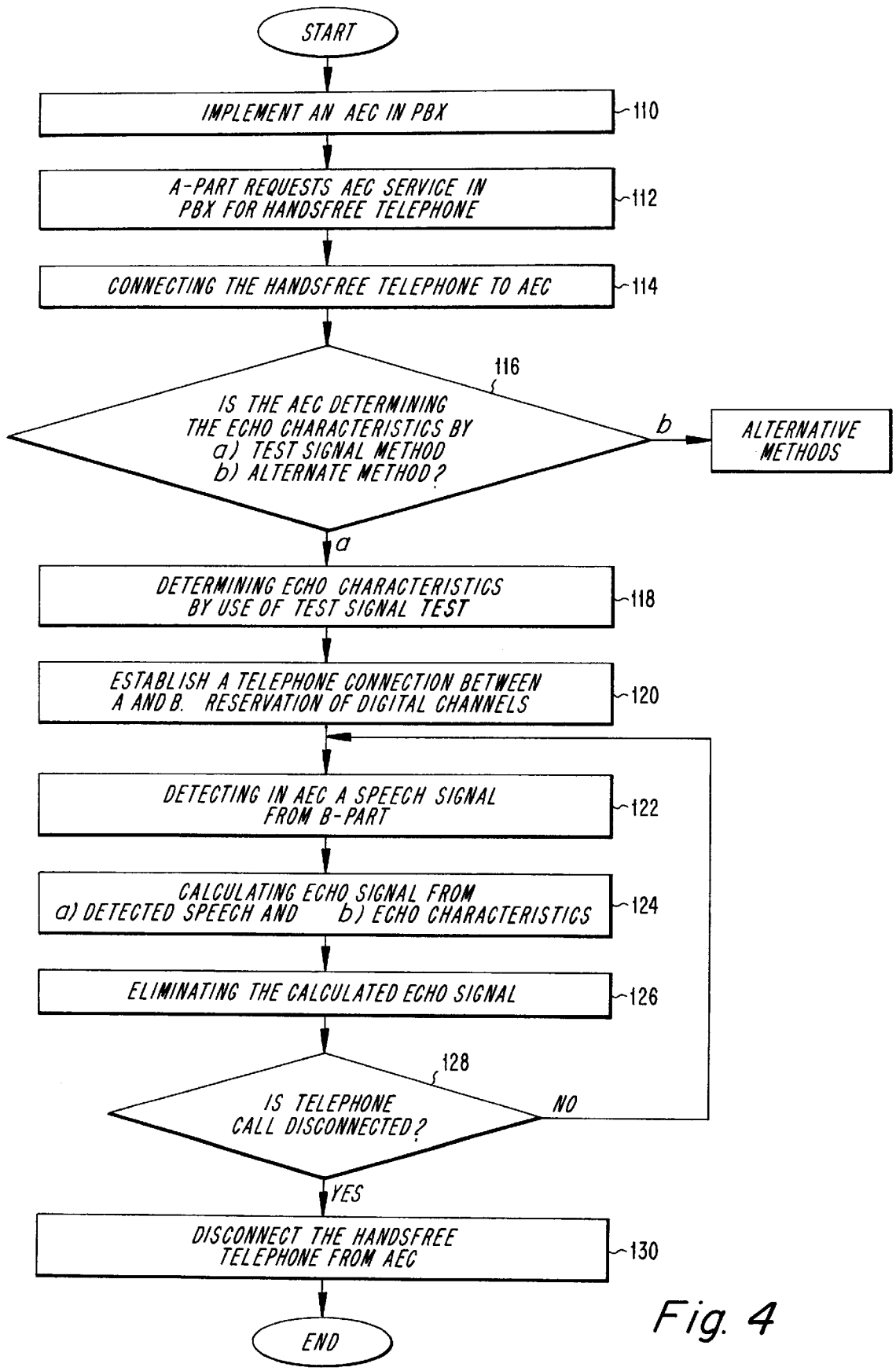
FIG. 4 is a flow chart describing the acoustical echo eliminating method according to the invention.

FIG. 4 illustrates the different method steps that are taken in a preferred embodiment of the invention for the purpose of eliminating acoustic echoes in conjunction with a telephone call between an A-part using a digital handsfree telephone and a B-part using any kind of telephone. The method is described also by reference to FIGS. 1, 2 and 3. The handsfree telephone is connected to the PBX.

At step 110, an acoustic echo controlling device is being implemented in the PBX and connected as described earlier. The acoustic echo controlling device is implemented in the digital signal processor DSP in the PBX. The A-part wants to make a call and wants to use the handsfree telephone. At step 112, he requests the AEC service in the PBX by dialling a specified code or if a Personal Computer is used as interface he requests the service via the PC. At step 114, the handsfree telephone 10 is then connected to the AEC device, which means that the AEC device 114 will operate on digital channels X2, Y3 allotted for the A-part.

At step 116, it is disclosed that the AEC can operate according to different methods. The preferred method is a method where a test signal is used for the purposes of determining the echo characteristics of the room, in which the handsfree telephone is placed. In an alternate method the echo characteristics of the room can be calculated without test signal. The speech signals are directly used for determining the echo characteristics of the room. The echo characteristics are then determined iteratively.

At step 118, the AEC is determining the echo characteristics of the room, by use of a test signal TEST sent from the AEC device 14. A detailed description was done in conjunction with FIGS. 2 and 3.

At step 120, the telephone call is being established between the A-part and the B-part. Establishing a call means allotting digital channels (time slots) for the A-part and the B-part. A first digital channel X1 is being allotted for speech signals received by the A-part, a second digital channel Y2 is being allotted for speech signals being sent from the A-part, a third digital channel X3 is being allotted for speech signals being sent from the B-part and a fourth digital channel Y4 is being allotted for speech signals received by the B-part. The switching of digital channels is done in the switching unit in the PBX.

A first speech signal BSPEECH is being sent from the B-part to the A-part on the first and the third channels X1,X3. At step 122, the speech signal BSPEECH is being detected in the AEC device in accordance with description of FIG. 2. At step 124, an echo signal which is returned from the A-part, will be calculated in an earlier described manner. At step 126, the echo signal will be reduced with the calculated echo signal in accordance with well known echo reducing methods in AEC devices. At step 128, there is a check whether the telephone call still is connected or if it is disconnected. If the telephone call is still connected the steps 122, 124 and 126 are repeated until the telephone call is disconnected. At step 130, the telephone call is disconnected and thus the handsfree telephone is being disconnected from the AEC device.

If the handsfree telephone 10 is permanently connected to the AEC time slots used for the handsfree telephone are always manipulated by the AEC. For example a telephone in a conference room which is always used as a handsfree telephone. It is also possible to connect the AEC-device during a telephone call. Then the speech is disconnected for a very short time while the test signal is being sent and analyzed.

We claim:

1. A method of eliminating acoustic echoes in conjunction with a telephone call between an A-part using a digital audio terminal (10) in a room and a B-part using a telephone (15), the digital audio terminal being connected to a digital exchange (12) within a telecommunication system, and for the telephone call a first digital channel (X1) being used for speech received by the A-part and a second digital channel (Y2) being used for speech transmitted from the A-part, said method comprising the steps of:

connecting the digital audio terminal (10) to an Acoustic Echo Controlling (AEC) device (14) implemented in the exchange (12);

determining the echo characteristics (EC) of the room in which the audio terminal is placed;

detecting in the AEC device (14) a first speech signal (BSPEECH) on the first digital channel (X1);

calculating an echo signal from the detected speech signal (BSPEECH) and the determined echo characteristics (EC) of the room; and eliminating in the AEC device (14) the calculated echo signal from a second speech signal (BSPEECH ECHO+ASPEECH) received in the AEC device (14) on the second digital channel (Y2) for the purpose of speech signals from the A-part to the B-part being sent without any disturbing echo signals.

2. A method in accordance with claim 1 comprising the step of: disconnecting a built-in voice switching circuit (32) located in the digital audio terminal.

3. A method in accordance with claim 1 comprising the step of:

the AEC device (14) simulaneously operating on several telephone calls.

4. A system for eliminating acoustic echoes in conjunction with a telephone call between an A-part using a digital audio terminal (10) in a room and a B-part using a telephone, wherein the acoustic echoes received from the A-part are due to speech by the B-part, the digital audio terminal being connected to a digital exchange (12) within a telecommunication system, and for the telephone call a first digital channel (X1) being used for speech received by the A-part and a second digital channel (Y2) being used for speech transmitted from the A-part, said system comprising:

an Acoustic Echo Controlling (AEC) device (14) implemented in the exchange (12) and operating on at least two digital channels (X1,Y2) allotted for a telephone call, wherein the AEC device (14) eliminates the acoustic echoes received from the A-part based on echo characteristics of the room that are determined by the AEC device (14).

5. A system in accordance with claim 4 further comprising:

means for connecting the digital audio terminal (10) to the AEC device (14).

6. A system in accordance with claim 5 further comprising:

means for disconnecting a built-in voice switching circuit located in the digital audio terminal.

7. A system for eliminating acoustic echoes in conjunction with a telephone call between an A-part using a digital audio terminal (10) in a room and a B-part using a telephone wherein the acoustic echoes received from the A-part are due to speech from the B-part, the digital audio terminal (10) being connected to a digital exchange (12) within a telecommunication system, said system comprising:

an Acoustic Echo Controlling (AEC) device (14) in the exchange (12), the AEC device (14) being connected to the digital audio terminal (10);

a detecting unit in the AEC device (14) for detecting a speech signal being sent from the B-part;

means for calculating, based on echo characteristics of the room, an acoustic echo signal that is being generated due to the speech signal; and means for eliminating in the AEC device (14) the calculated acoustic echo signal for the purpose of speech signals from the A-part to the B-part being sent without any disturbing acoustic echo signals.

8. A system in accordance with claim 7 comprising:

means for disconnecting a built-in voice switching circuit located in the digital audio terminal.

9. A method of eliminating acoustic echoes in conjunction with a telephone call between an A-part using a digital audio terminal (10) in a room and a B-part using a telephone, the digital audio terminal (10) being connected to a digital exchange (12) within a telecommunication system, said method comprising the steps oft implementing an Acoustic Echo Controlling (AEC) device (14) in the digital exchange (12);

connecting the digital audio terminal (10) to the Acoustic Echo Controlling (AEC) device (14) in the exchange;

sending a test signal (TEST) from the AEC device (14) in the exchange to the digital audio terminal (10);

detecting in the AEC device (14) the acoustic echo originating from the test signal in the room where the digital audio terminal is placed;

determining in the AEC device the echo characteristics of the room;

establishing a telephone call between the A-part and the B-part whereby the A-part is connected to the AEC device (14) in the exchange and whereby a first digital channel (X1) is being allotted for speech signals received by the A-part, a second digital channel (Y2) is being allotted for speech signals transmitted by the A-part, a third digital channel (X3) is being allotted for speech signals being sent from the B-part and a fourth digital channel (Y4) is being allotted for speech signals received by the B-part;

sending a first speech signal (BSPEECH) from the B-part to the A-part on the first and the third channels (X1, X3);

detecting in the AEC device (14) the first speech signal (BSPEECH) being sent from the B-part on the first digital channel (X1);

calculating an echo signal (BECHO) that is being generated due to partly the detected signal, partly the determined echo characteristics of the room, and which echo signal (BECHO) appears on the second channel (Y2);

receiving the echo signal (BECHO) in the AEC device in the digital exchange; and eliminating in the AEC device the calculated echo signal (BECHO);

whereby the A-part simultaneously can send a second speech signal (ASPEECH) to the B-part without any disturbing echo signals generated due to the first speech signal.

10. A method in accordance with claim 9 comprising the step of:

disconnecting a built-in voice switching circuit located in the digital audio terminal.

11. A system for eliminating acoustic echoes in conjunction with a telephone call between an A-part and a B-part, the system comprising:

a digital audio terminal (10) used by the A-part;

a telephone (15) used by the B-part;

a digital exchange (12) connected to the digital audio terminal (10);

an Acoustic Echo Controlling (AEC) device (14) in the digital exchange (12);

means for connecting the digital audio terminal (10) to the Acoustic Echo Controlling (AEC) device (14) in the exchange;

means for sending a test signal (TEST) from the AEC device in the exchange to the digital audio terminal;

means for detecting in the AEC device (14) the acoustic echo originating from the test signal in the room where the digital audio terminal is placed;

means for determining in the AEC device the echo characteristics of the room;

means for establishing a telephone call between the A-part and the B-part whereby digital channels are allotted for the telephone call (X1,Y2,X3,Y4);

means for sending a first speech signal (BSPEECH) from the B-part to the A-part on allotted digital channels;

means for detecting in the AEC device the first speech signal (BSPEECH) being sent from the B-part on the allotted digital channel (X3);

means for calculating an echo signal (BSPEECH ECHO) that is being generated due to partly the detected signal, partly the determined echo characteristics of the room, and which echo signal (BSPEECH ECHO) appears on the second channel (Y2);

means for receiving the echo signal (BSPEECH ECHO) in the AEC device in the digital exchange; and means for eliminating in the AEC device the calculated echo signal (BSPEECH ECHO);

whereby the A-part simultaneously can send a second speech signal (ASPEECH) to the B-part without any disturbing echo signals generated from the first speech signal.

12. A system in accordance with claim 11 further comprising:

means for disconnecting a built-in switching circuit located in the digital audio terminal.

* * * * *